(12) United States Patent
Chung

(10) Patent No.: US 8,477,101 B2
(45) Date of Patent: Jul. 2, 2013

(54) READING DEVICE FOR ELECTRONIC DOCUMENT AND OPERATION METHOD OF READING ELECTRONIC DOCUMENT

(75) Inventor: Tzu-Chiang Chung, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1023 days.

(21) Appl. No.: 12/501,493

(22) Filed: Jul. 13, 2009

(65) Prior Publication Data

US 2010/0020017 A1    Jan. 28, 2010

(30) Foreign Application Priority Data

Jul. 22, 2008  (TW) .............................. 97127860 A

(51) Int. Cl.
*G09G 5/00*   (2006.01)
(52) U.S. Cl.
USPC ........................................................ 345/169
(58) Field of Classification Search
USPC ..... 345/156, 168, 173, 169; 715/863; 463/30; 178/18.01; 348/211.2
See application file for complete search history.

(56) References Cited

U.S. PATENT DOCUMENTS

| | | | |
|---|---|---|---|
| 6,798,429 B2 * | 9/2004 | Bradski | 345/156 |
| 7,136,846 B2 * | 11/2006 | Chang et al. | 1/1 |
| 8,077,138 B2 * | 12/2011 | Breunig et al. | 345/102 |
| 2008/0036732 A1 | 2/2008 | Wilson et al. | |

FOREIGN PATENT DOCUMENTS

| | | |
|---|---|---|
| CN | 1734407 | 2/2006 |
| CN | 101025909 | 8/2007 |
| TW | I265444 | 11/2006 |
| TW | 200723063 | 6/2007 |
| TW | 200729926 | 8/2007 |

OTHER PUBLICATIONS

"1st Office Action of China Counterpart Application", issued on Jul. 15, 2010, p. 1-p. 8.

* cited by examiner

*Primary Examiner* — Abbas Abdulselam
(74) *Attorney, Agent, or Firm* — Jianq Chyun IP Office

(57) ABSTRACT

A reading device for an electronic document and an operation method of reading an electronic document are provided. The reading device for the electronic document includes an input module and a main body. When the user operates the input module to move in 3D space, the input module can detect a motion state of the input module in the 3D space and generate motion data. Additionally, the main body includes a screen used for displaying a picture of the electronic document. The main body may be connected with the input module via a wireless transmission path. As a result, the main body can receive the motion data generated by the input module and compute the motion data to generate an operation instruction, and then the main body may adjust the picture of the electronic document according to the operation instruction.

12 Claims, 5 Drawing Sheets

READING DEVICE FOR ELECTRONIC DOCUMENT AND OPERATION METHOD OF READING ELECTRONIC DOCUMENT

CROSS-REFERENCE TO RELATED APPLICATION

This application claims the priority benefit of Taiwan application serial no. 97127860, filed on Jul. 22, 2008. The entirety of the above-mentioned patent application is hereby incorporated by reference herein and made a part of specification.

BACKGROUND OF THE INVENTION

1. Field of the Invention

The invention relates to an input module and, more particularly, to an input module used for operating an electronic book.

2. Description of the Related Art

Nowadays, information is digitized, and more and more electronic products replace traditional information interfaces. For example, a digital frame and a digital camera replace traditional photographic paper and negatives. The electronic product such as a personal digital assistant (PDA), a pocket computer (pocket PC), or an intelligent mobile phone becomes a new-generation document processing platform. Nowadays, a user can write an electronic mail (E-mail), and read or watch an electronic document such as an electronic book or a digital photo via the electronic product such as the PDA, the Pocket PC, or the mobile phone.

It is well known that the volume of the electronic product such as a personal digital assistant (PDA), a pocket computer (pocket PC), or an intelligent mobile phone is not large to allow a user to carry about it. Consequently, the size of a display screen of the electronic product is rather limited. To allow the user to smoothly watch the electronic document on the screen with the limited size, manufacturers develops different operation methods allowing the user to operate the electronic document more intuitively when he or she reads the electronic document.

Since a touch panel has been greatly developed, it provides a better choice about an operating interface for a digital electronic product pursuing the characteristics of being small, light, short and thin. Since the touch panel has both display and operation characteristics, when the touch panel is disposed at the electronic product, the user may operate the electronic product more intuitively. Furthermore, the number of keys on the electronic product may be decreased to reduce the size of the electronic product. In today's market, some manufacturers utilize the function of the touch panel capable of sensing a trace of a moving human figure on the touch panel to allow the user to directly zoom in on, zoom out on, or translate the picture displayed on the screen by moving the figure on the screen. The user does not need to click other instructions, and thus he or she may operate and control the electronic device more intuitively and conveniently.

Although the operation method as stated above is very convenient and intuitive, when a display picture of an image is zoomed in or zoomed out, it cannot be translated at the same time. As a result, it is inconvenient for the user. For example, the user utilizes the electronic product such as the PDA to watch a comic strip or a file having a figure. Since the layouts of the files are usually unorderly due to the beauty of the layout, when the user wants to watch the image at a zone more clearly, he or she may zoom in on the image at the zone to the whole picture. However, if the user wants to watch the image at another zone, he or she needs to first zoom out on the display picture, and then translate the picture. When the user finds the image at the zone to be watched, he or she zooms in on the image to the whole picture. It is rather inconvenient for the user to operate the electronic product utilizing the stated operation method, and the user may be unwilling to read the electronic book. As a result, the electronic book is not easily to be popularized.

BRIEF SUMMARY OF THE INVENTION

The invention provides a reading device for an electronic document including an input module and a main body. When a user operates the input module to move in a three dimensional (3D) space, the input module can detect a motion state of the input module in the 3D space and generate motion data. Additionally, the main body includes a screen for displaying a picture of an electronic document, and the main body may be connected with the input module via a wireless transmission path. As a result, the main body can receive the motion data generated by the input module and compute the motion data to generate an operation instruction. Thus, the main body can adjust the picture of the electronic document according to the operation instruction.

The invention further provides an operation method of reading an electronic document adapted for a mobile device. Furthermore, the mobile device can display a picture of an electronic document. The operation method according to the invention includes the following steps. First, a motion state of an input module in the 3D space is detected from an input end, and motion data is generated. Second, the motion data may be transmitted from the input end to the mobile device via a wireless transmission path. At the time, the motion data may be decoded, and an operation instruction is generated to the mobile device. Then, the picture of the electronic document may be adjusted according to the operation instruction.

The invention further provides an input module which can be adapted for the reading device as stated above. The input module according to the invention includes an operation unit, a first acceleration sensor, a control unit, and a wireless transmission unit. The control unit is coupled with the operation unit and the first acceleration sensor to receive a state signal generated by the operation unit and a first acceleration value generated by the first acceleration sensor and generate motion data. The first acceleration value is generated by the first acceleration sensor when the first acceleration sensor senses the acceleration of the input module in a first direction axis in the space. Additionally, the wireless transmission unit may be coupled with the control unit to transmit the motion data to an electronic device such as the reading device to operate a read of the electronic document.

To sum up, since the input module according to the invention includes a plurality of acceleration sensors, it can detect the motion state of the user in the 3D space. As a result, the user can operate the read of the electronic document more intuitively and more conveniently by operating the input module.

These and other features, aspects and advantages of the present invention will become better understood with regard to the following description, appended claims, and accompanying drawings.

DETAILED DESCRIPTION OF THE EMBODIMENTS

Figure 1:
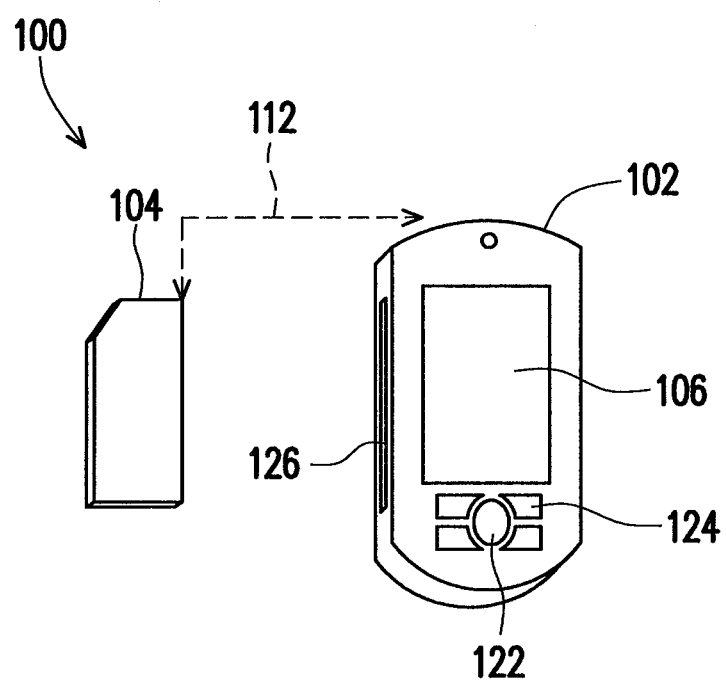
FIG. 1 is a system block diagram showing a reading device for an electronic document according to a preferred embodiment of the invention.

FIG. 1 is a system block diagram showing a reading device for the electronic document according to a preferred embodiment of the invention. A reading device for the electronic document 100 according to the invention includes a main body 102 and an input module 104. The main body 102 has a screen 106 for displaying an electronic document such as an electronic book or a digital photo. In some embodiments, the screen 106 may be a liquid crystal display (LCD) or a touch panel.

The main body 102 may be connected with the input module 104 via a wireless or a wire transmission path 112. In this embodiment, the wireless transmission path 112 may be a Bluetooth transmission path or an infrared transmission path. Additionally, the main body 102 may be an electronic device such as a PDA, a palm computer, an intelligent mobile phone or even a desktop computer which may be used for reading the electronic document. Many function keys such as function keys 122 and 124 may be disposed on the main body 102. In some embodiments, a holding recess 126 may be formed at the main body 102. As a result, when the input module 104 is not used, it can be put in the holding recess 126.

Figure 2:
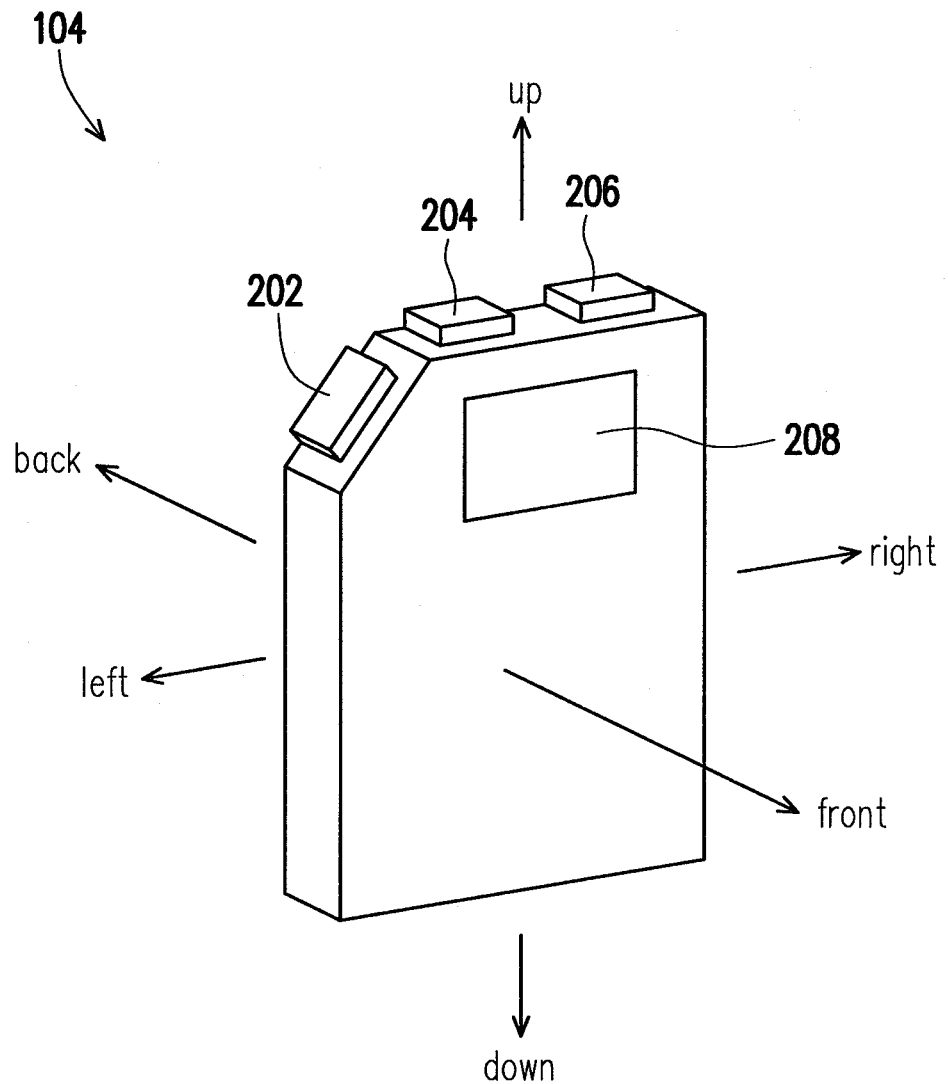
FIG. 2 is a schematic diagram showing appearance of an input module according to a preferred embodiment of the invention.

FIG. 2 is a schematic diagram showing appearance of an input module according to a preferred embodiment of the invention. The size and the outline of the input module 104 may be similar to, but not limited to, those of a secure digital (SD) memory card. Many operation units such as function keys 202, 204, 206, and 208 may be disposed on the input module 104. In other embodiments, the function keys 202, 204, 206, and 208 may be replaced by a touch panel.

The input module 104 is used for operating a picture of an electronic document displayed on the main body 102 as shown in FIG. 1. Some operation embodiments hereafter are taken as examples to illustrate how the user uses the input module 104 to operate the picture of the electronic document displayed on the main body 102.

1. When the function key 202 is enabled, if the user moves the input module 104 towards left or right, a pointer on the picture of the electronic document is moved towards left or right accordingly.
2. The function keys 204 and 206 may simulate functions of a left mouse button and a right mouse button. For example, when the pointer on the picture displayed by the main body chooses an electronic document, the user may continually press the function key 204 twice to open the chosen electronic document.
3. When the function key 208 is enabled, if the user operates the input module 104 to move forward or backward, the picture of the electronic document displayed by the main body 102 is zoomed in or zoomed out correspondingly. When the function key 208 is enabled, if the user operates the input module 104 leftward, rightward, upward or downward, the picture of the electronic document displayed by the main body 102 is correspondingly translated to a corresponding zone of the electronic document. As a result, the user can control the picture of the electronic document displayed by the main body 102 to be zoomed in, zoomed out, and translated at the same time by operating the input module 104. Thus, it is more convenient for the user to operate the reading device for the electronic document 100.

Although some functions of the function keys are illustrated in the above embodiments, but they are not limited herein. Persons having ordinary skill in the art may modify and change the functions of the function keys according to practical demands. Additionally, the number and the position of the function key may also be adjusted.

Moreover, although the user may control the picture of the electronic document displayed by the main body 102 to be zoomed in, zoomed out, and translated at the same time by operating the input module 104, he or she may also control the picture of the electronic document displayed by the main body 102 to be zoomed in, zoomed out, and translated at different time as traditional technology.

Figure 3:
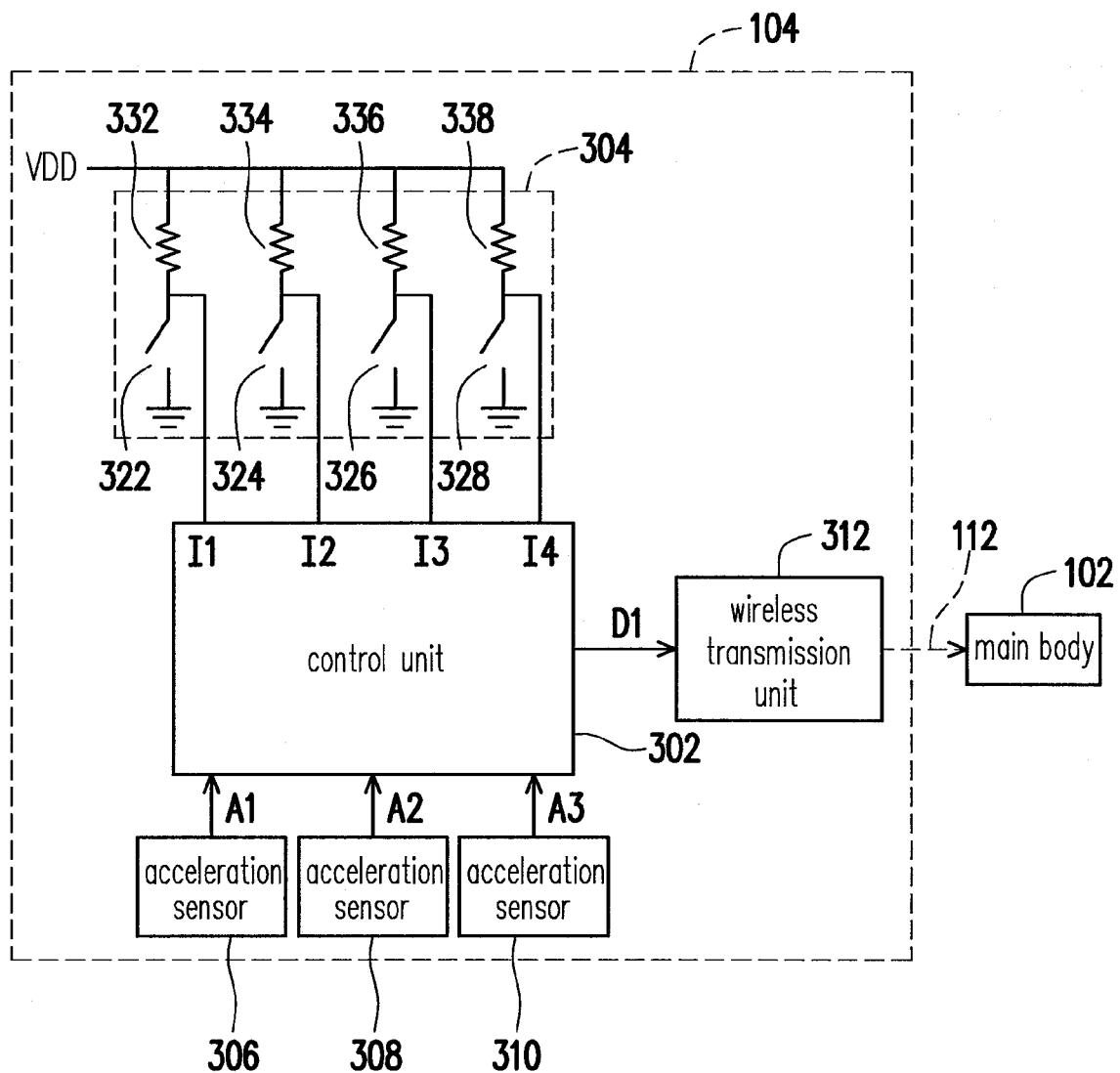
FIG. 3 is a block diagram showing a circuit of an input module according to a preferred embodiment of the invention.

FIG. 3 is a block diagram showing a circuit of an input module according to a preferred embodiment of the invention. The input module 104 includes a control unit 302, an operation unit 304, acceleration sensors 306, 308, and 310, and a wireless transmission unit 312. The acceleration sensors 306, 308, and 310 are use for sensing the acceleration of the input module 104 at a first direction axis, a second direction axis, and a third direction axis of the 3D space and outputting acceleration values A1, A2, and A3 to the control unit 302, respectively.

Additionally, when the operation unit of the input module 104 is realized by the function key, the operation unit 304 may include switches 322, 324, 326, and 328, and resistors 332, 334, 336, and 338. One end of each of the switches 322, 324, 326, and 328 is coupled with ground. The other end of each of the switches 322, 324, 326, and 328 is coupled with voltage VDD via the resistors 332, 334, 336, and 338, respectively, and coupled with one of signal input ends I1, I2, I3, and I4 of the control unit 302, respectively. In this embodiment, it is determined that whether the switches 322, 324, 326, and 328 are conducted or not according to that whether the function keys 202, 204, 206, and 208 as shown in FIG. 2 are pressed or not.

For example, when all the function keys 202, 204, 206, and 208 on the input module 104 are not pressed by the user, the switches 322, 324, 326, and 328 are in a floating state. At the time, all the potential of the signal input ends I1, I2, I3, and I4 of the control unit 302 is VDD. Correspondingly, when one of the function keys on the input module 104 is pressed, a corresponding switch is conducted, and thus the potential of a corresponding signal input end is pulled down to be ground voltage. Consequently, the control unit 302 can detect the state of each operation unit according to the potential of each of the signal input ends I1, I2, I3, and I4.

After the control unit 302 receives the acceleration values A1, A2, and A3 and detects the state of the each operation unit, it may generate motion data D1. In this embodiment, to make the input module 104 save power, the control unit 302 may not compute the motion data D1, and it directly transmit the motion data D1 to the wireless transmission unit 312. After the wireless transmission unit 312 receives the motion data D1, the motion data D1 may be transmitted to the main body 102 via the wireless transmission path 112.

Figure 4:
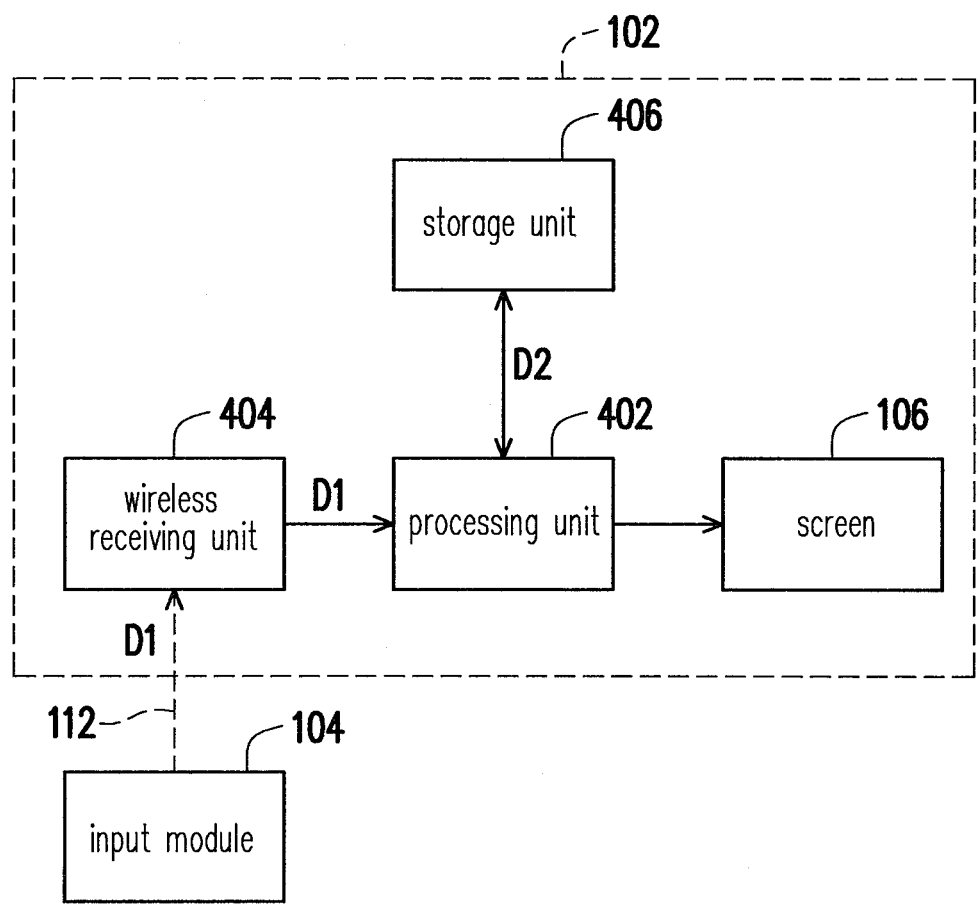
FIG. 4 is a system block diagram showing an interior of a main body according to a preferred embodiment of the invention.

FIG. 4 is a system block diagram showing an interior of a main body according to a preferred embodiment of the invention. The main body 102 may include a processing unit 402, a wireless receiving unit 404, and a storage unit 406. The processing unit 402 may be coupled with a wireless receiving unit 404, the storage unit 406, and the screen 106. The storage unit 406 may be a storage such as a storage card or a flash memory. The storage unit 406 may store the electronic document therein. Consequently, the processing unit 402 may retrieve electronic document data D2 from the storage unit 406 according to the operation of the user to the main body 102, and the picture of the electronic document data D2 read by the reading device for the electronic document is displayed on the screen 106.

After the wireless receiving unit 404 receives the motion data D1 transmitted by the input module 104 via the wireless transmission path 112, it can transmit the motion data D1 to the processing unit 402. At the time, the processing unit 402 may decode and compute the motion data D1. For example, the processing unit 402 performs twice differential operations and a low-pass filtering operation. As a result, the processing unit 402 can obtain an operation instruction, and then the processing unit 402 may adjust the picture of the electronic document displayed on the screen 106 according to the operation instruction.

Figure 5:
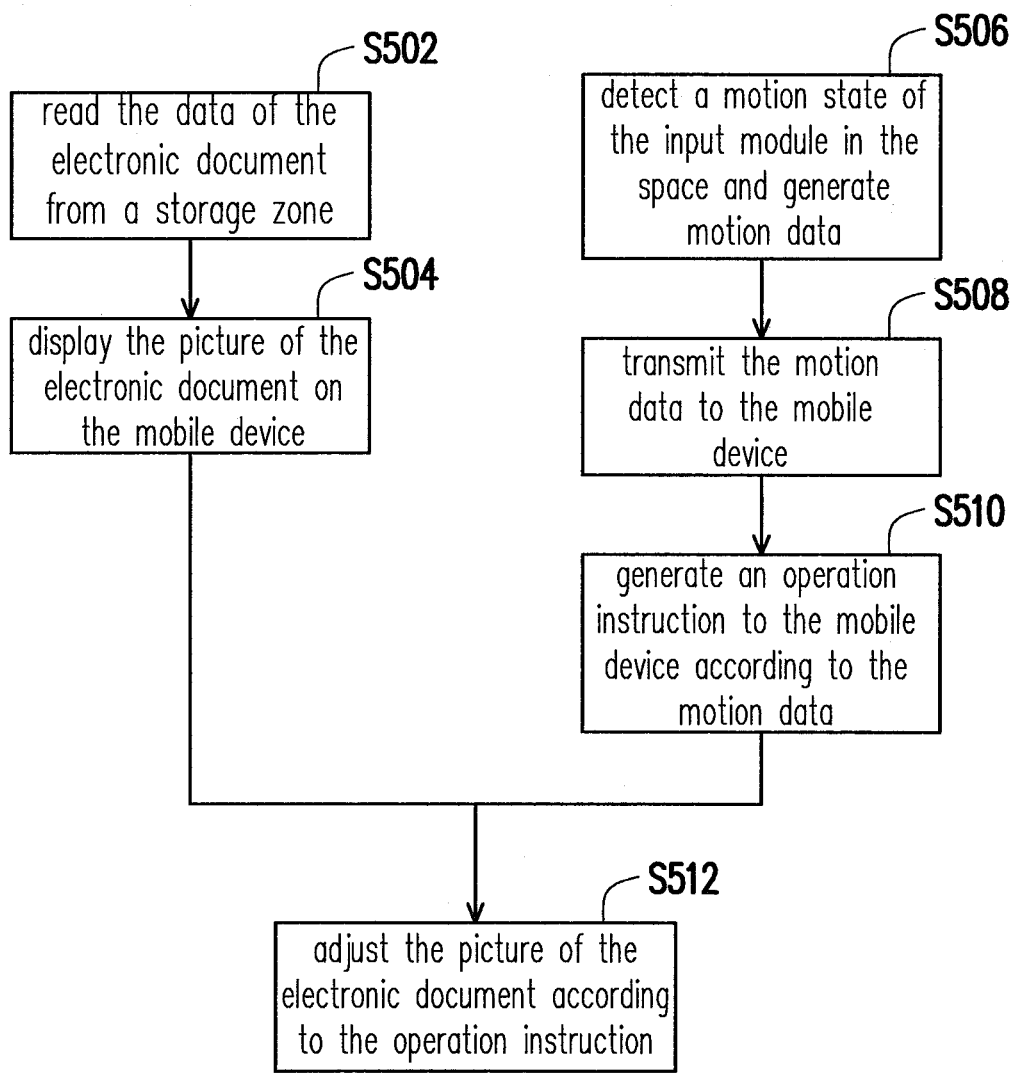
FIG. 5 is a flow chart showing a method of operating an electronic book according to a preferred embodiment of the invention.

FIG. 5 is a flow chart showing a method of operating an electronic book according to a preferred embodiment of the invention. The method may be used at a mobile device with the main body 102. The method according to the embodiment includes the step of reading data of the electronic document from a storage zone (such as the storage unit 406 in FIG. 4), as stated in step S502. Additionally, in this embodiment, the picture of the electronic document may be displayed on the mobile device as stated in step S504.

On the other hand, in an embodiment of the invention, the motion state of the input module 104 as shown in FIG. 1 in the space may be detected to generate the motion data as stated in step S506. Then, the motion data may be transmitted to the mobile device as stated in step S508. At the time, in this embodiment, the operation instruction may be generated to the mobile device according to the motion data as stated in step S510. As a result, the mobile device may adjust the picture of the electronic document according to the generated operation instruction as stated in step S512.

To sum up, in the invention, the input module has a plurality of acceleration sensors used for sensing the acceleration of the input module at different direction axes of the 3D space. As a result, the user can operate the read of the electronic document more intuitively and conveniently by operating the input module.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A reading device for an electronic document, comprising:
   an input module moving in space to generate motion data, comprising a first operation unit, a second operation unit, a third operation unit, and a fourth operation unit; and
   a main body including a screen for displaying a picture of the electronic document, wherein the main body computes according to the motion data and generates an operation instruction for adjusting the picture of the electronic document,
   wherein when the first operation unit is enabled, a pointer on the picture of the electronic document is moved according to the motion data,
   wherein the second operation unit and the third operation unit perform a first function and a second function to the electronic document,
   wherein when the forth operation unit is enabled, the picture of the electronic document is zoomed in, zoomed out or translated according to the motion data.

2. The reading device according to claim 1, wherein the input module comprises:
   a first acceleration sensor used for sensing the input module acceleration at a first direction axis in the space and generating a first acceleration value;
   a control unit coupled with the operation unit and the first acceleration sensor, wherein the control unit is used for generating the motion data according to the state signal and the first acceleration value; and
   a wireless transmission unit coupled with the control unit, wherein the wireless transmission unit is used for receiving the motion data and transmitting the motion data to the main body via a wireless transmission path.

3. The reading device according to claim 2, wherein the input module further comprises a second acceleration sensor and a third acceleration sensor used for detecting the input module acceleration at a second direction axis and a third direction axis in the space and generating a second acceleration value and a third acceleration value to the control unit, respectively.

4. The reading device according to claim 2, wherein the main body comprises:
   a wireless receiving unit receiving the motion data via the wireless transmission path;
   a storage unit used for storing the electronic document; and
   a processing unit coupled with the storage unit, the wireless receiving unit, and the screen, wherein the electronic document is retrieved from the storage unit by the processing unit and displayed on the screen, and the processing unit is used for adjusting the picture of the electronic document according to the operation instruction.

5. The reading device according to claim 2, wherein the wireless transmission path is a Bluetooth transmission path.

6. The reading device according to claim 1, wherein the first operation unit, the second operation unit, the third operation unit, and the forth operation unit are a plurality of function keys.

7. The reading device according to claim 1, wherein the first operation unit, the second operation unit, the third operation unit, and the forth operation unit are realized by a touch panel.

8. An input module, adapted for an electronic device capable of being used for reading an electronic document, the input module comprising:
   a first operation unit, configured to enable a pointer movement on the picture of the electronic document;
   a second operation unit and a third operation unit, configured to respectively perform a first function and a second function to the electronic document;
   a forth operation unit, configured to enable the zoom in, zoom out or translation of the picture of the electronic document;
   a first acceleration sensor used for sensing acceleration of the input module at a first direction axis of space and generating a first acceleration value;

a control unit coupled with the operation unit and the first acceleration sensor, wherein the control unit is used for generating motion data according to the condition of the first operation unit, the second operation unit, the third operation unit or the forth operation unit, and the first acceleration value; and a wireless transmission unit coupled with the control unit, wherein the wireless transmission unit is used for transmitting the motion data to the electronic device to operate a read of the electronic document.

9. The input module according to claim 8, wherein the first operation unit, the second operation unit, the third operation unit, and the forth operation unit are a plurality of function key.

10. The input module according to claim 8, wherein the first operation unit, the second operation unit, the third operation unit, and the forth operation unit are realized by a touch panel.

11. The input module according to claim 8, wherein the input module further comprises a second acceleration sensor and a third acceleration sensor used for detecting the input module acceleration at a second direction axis and a third direction axis in the space and generating a second acceleration value and a third acceleration value to the control unit, respectively.

12. The input module according to claim 8, wherein the electronic device is a PDA, a palm computer, or a mobile phone.

* * * * *